Aug. 11, 1964                 A. K. WATT                    3,143,951
            AIR VENT VALVE STRUCTURES FOR PASSENGER VEHICLES
Filed Aug. 17, 1961                                  2 Sheets-Sheet 1

INVENTOR.
Andrew K. Watt
BY
George E. Johnson
ATTORNEY

INVENTOR.
Andrew K. Watt
BY George E. Johnson
ATTORNEY

3,143,951
AIR VENT VALVE STRUCTURES FOR PASSENGER VEHICLES
Andrew K. Watt, Lansing, Mich., assignor to General Motors Corporation, Detroit, Mich., a corporation of Delaware
Filed Aug. 17, 1961, Ser. No. 132,198
3 Claims. (Cl. 98—2)

This invention relates to automobiles and more particularly to air vent valve structures for the passenger compartments of such vehicles.

In heating, air conditioning, or ventilating car bodies, it is common practice slightly to pressurize the passenger compartments and provide openings or sufficient leakage that stale air will be forced out preventing incoming drafts and dust. The pressure may be created by ram effect due to the movement of the vehicle or by suitable blower means. A suitable one-way vent is disclosed in the United States Patent No. 2,802,692, granted August 13, 1957, in the name of H. R. Stocks.

It has now been found that a suitable one-way air vent valve structure may be provided which not only serves efficiently to vent stale air from a vehicle passenger compartment but which is adapted to be located in a zone better to clarify the air for all passengers and also has potentialities in the interest of enhancing automobile body appearance and styling.

An object of the present invention is to provide an improved air vent valve structure for passenger vehicles. Another object is to provide an air vent valve structure in an automobile body so no dead pockets of stale air need be retained in the passenger compartment.

A feature of the invention is a flat damper-type valve member arranged above a substantially horizontal valve seat in a zone above the package shelf of a vehicle and adapted to control a vent passage connecting the passenger compartment to the ambient air.

These and other important features of the invention will now be described in detail in the specification and then pointed out more particularly in the appended claims.

Figure 1:
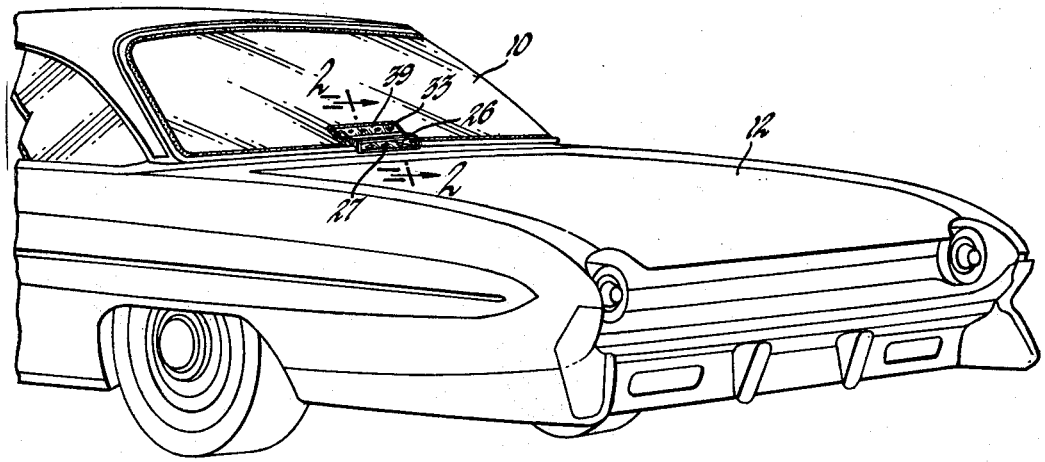
FIGURE 1 is a perspective view of the rear portion of an automobile vehicle in which an air vent valve structure as one embodiment of the present invention, is installed.
Figure 2:
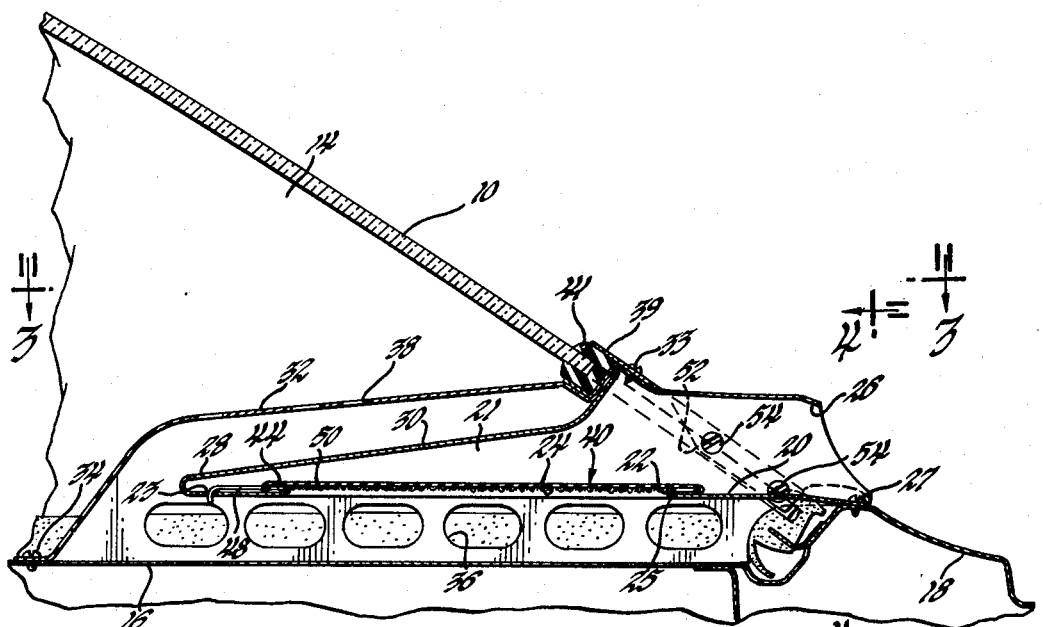
FIGURE 2 is an enlarged sectional view looking in the direction of the arrows 2—2 in FIGURE 1.
Figure 3:
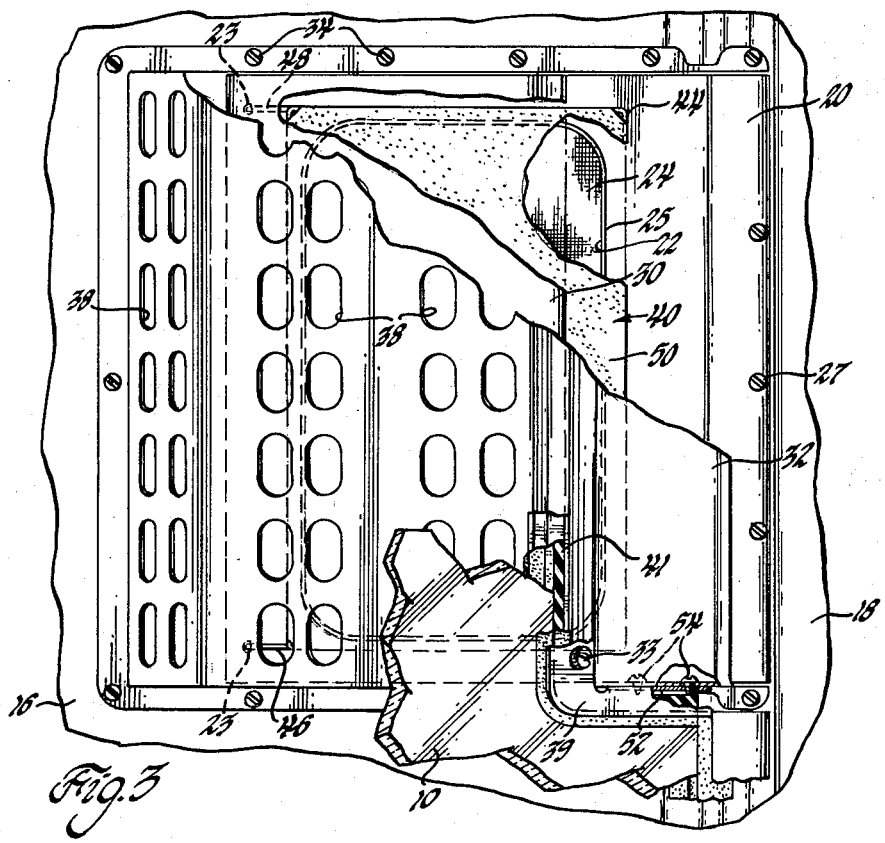
FIGURE 3 is a sectional view looking in the direction of the arrows 3—3 in FIGURE 2.
Figure 4:
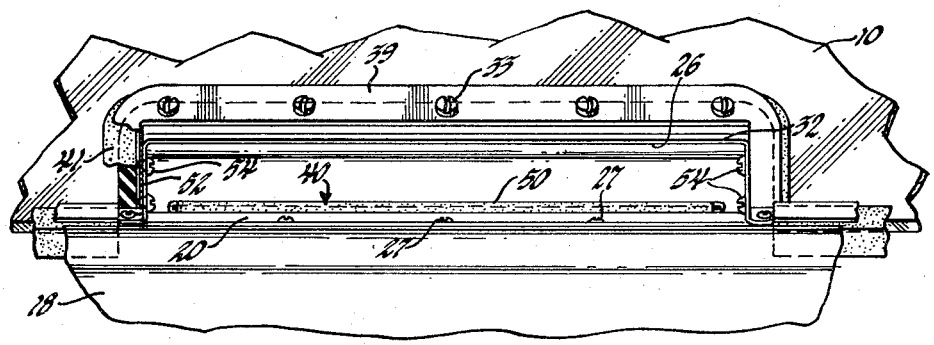
FIGURE 4 is a sectional view looking in the direction of the arrows 4—4 in FIGURE 2.

In FIGURE 1, the automobile depicted is disclosed as having a rear window 10 and a trunk lid 12. The window 10 partially defines a passenger compartment 14 in the rear zone of which is located a package shelf 16 best seen in FIGURE 2. The rear portion 18 of the body metal work is such as to extend beneath the trunk lid 12 as is conventional.

Spaced above the package shelf 16 and arranged substantially horizontally is a wall 20 defining a large air inlet port 22 and two spaced small openings 23. The large port 22 is provided with a transverse and fixed permeable sheet or screen 24 and is surounded by a seat 25 which is substantialy horizontal. The wall 20 is attached by screws 27 to the body portion 18 and is a part of a baffle housing having a chamber 21 and a rearwardly directed discharge opening 26 leading to the ambient air and a forwardly directed tapered portion 28. The upper wall 30 of the housing is imperforate as is the entire housing except for the port 22 and the opening 26. The housing 30 is enclosed between the package shelf 16 and a perforated cover member 32. An intermediate portion of the latter is joined to sealing structure at the base of the window 10 by screws 33 and its three sides are flanged and fastened to the package shelf 16 as by way of screws 34. The two opposite side walls of the cover 32 are apertured as at 36 and its inside top and forward walls are apertured at 38. An ornamental U-shaped plate 39 cooperates with rubber seal means 41 and the screws 33 in forming a tight joint. A downturned flange 52 at each leg of the U-shaped plate 39 is attached by screws 54 to a side wall of the cover member 32.

Enclosed within the baffle housing 30 and in registry with the opening 22 is a damper-like flat valve member 40. This member comprises a wire frame 44 having two forwardly directed arms 46 and 48. Each of these arms has a downwardly turned end extending loosely through an opening 23 of the wall 20. An imperforate sheet or cover 50 is stretched over and fixed to the frame to form a light-weight unitary damper and the entire weight of the valve member is adapted to rest upon the seat 25 when air pressure above atmosphere is not present within the passenger compartment 14.

From the above, it is clear how the air vent valve structure operates. It may be stated, however, that air entering through the perforations of the cover 32 is guided around the tapered portion 28 of the baffle housing 30 and if it is under sufficient pressure, the valve member 40 will be caused to rise or float above the seat 25 and the screen 24. The air will then be vented from the compartment 14 in discharging to the outside atmosphere by way of the opening 26.

Because of the specific location of the vent valve structure—that is, above the package shelf—the general distribution of heated air, ventilation, or air conditioning air within the passenger compartment 14 is not adversely effected but, to the contrary, the vent structure is enabled to give the most desirable circulation of air to all passengers which may be present within the vehicle body and whether there be one, two or more seats. In addition to these advantages, the air circulation and venting provided keeps the windows clear.

I claim:

1. An air vent valve structure in an automobile body having a package shelf and a rear window above said shelf, said valve structure including a perforated cover member mounted on said shelf, a baffle housing extending from outside said body and between said shelf and cover member and defining a chamber connected to the interior of said cover member above said shelf by an inlet port and to the ambient air by an outlet opening, a frame covered with an impermeable sheet to constitute a unitary damper valve member of sufficiently light weight to be actuated by the differential air pressure exertable thereon, and said valve member being movably mounted and extending substantially horizontally within said chamber and in registry with said inlet port.

2. An air vent valve structure for an automobile body having a package shelf and a rear window above said shelf, said valve structure including a housing defining a chamber, a substantially horizontal and botom wall of said housing being adapted to be mounted in spaced relation with said package shelf and having an inlet port, a screen extending across said inlet port, a rear portion of said housing having an outlet leading from said chamber and adapted to extend beneath said rear window to the atmosphere outside the automobile body, a valve member in registry with said inlet port and located in said chamber, and the arrangement being such that air pressure above atmospheric pressure on the underside of said valve member may effect the lifting of the latter to vent said body.

3. An air vent valve structure as set forth in claim 2, the said inlet port being surrounded by a seat, and said valve member comprising a movable frame supporting a flexible and impermeable covering of sufficiently light weight to be actuated by air pressure to cooperate with said seat in effecting damper action in closing and opening said inlet port.

References Cited in the file of this patent

UNITED STATES PATENTS

| | | |
|---|---|---|
| 162,261 | Wightman | Apr. 20, 1875 |
| 2,223,709 | Wickstrom | Dec. 3, 1940 |
| 2,667,113 | Ackermans | Jan. 26, 1954 |
| 2,670,671 | Haltenberger | Mar. 2, 1954 |
| 2,787,206 | Dustman | Apr. 2, 1957 |
| 2,849,941 | Negord | Sept. 2, 1958 |